Figure 1:
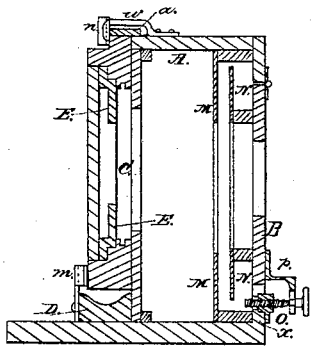
Figure 3:
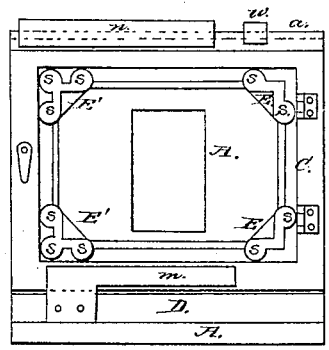
Figure 4:
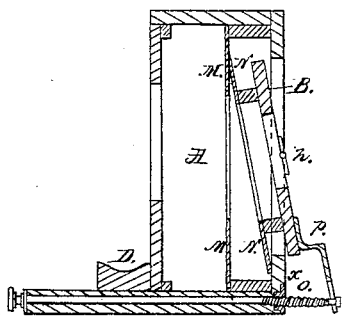
Figure 2:
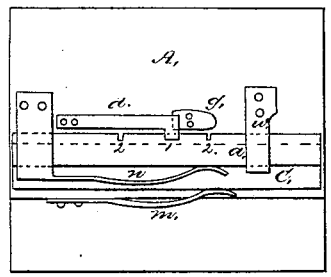
Figure 5:
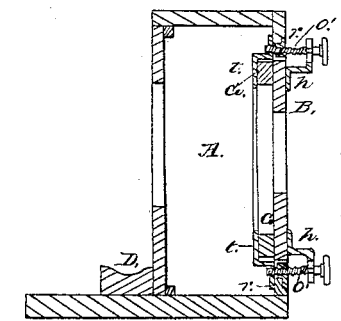
Figure 6:
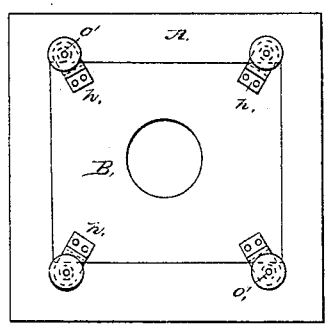

J. Stock,
Camera Attachment.
Nº 42,971. Patented May 31, 1864.

Witnesses.
Henry E. Roeder
Jacob Stock.

Inventor:
John Stock

UNITED STATES PATENT OFFICE.

JOHN STOCK, OF NEW YORK, N. Y.

PHOTOGRAPHIC CAMERA.

Specification forming part of Letters Patent No. 42,971, dated May 31, 1864.

*To all whom it may concern:*

Be it known that I, JOHN STOCK, of New York, in the county and State of New York, have invented a new and Improved Photographic Camera; and I do hereby declare that the following is a full and exact description thereof, reference being had to the accompanying drawings, and to the letters of reference marked thereon.

The nature of my invention consists, first, in the arrangement and construction of the vitrified or similar corners in the plate-holder, whereby the fitting of the same is very much simplified and a greater accuracy in their position is obtained; secondly, in the arrangement of hanging the plate-holder and the manner of moving the same for the purpose of taking two or more pictures; thirdly, in the arrangement of a movable front plate, on which the lenses are attached, for the purpose of regulating the lenses, so as to get the picture in proper line.

Figure I represents a cross-section of my improved camera. Fig. II shows a top view of the same, and Fig. III is an end view with the door of the plate-holder removed. The other figures represent different arrangements hereinafter refe red to.

Similar letters represent similar parts in all the figures.

In the accompanying drawings, A represents the camera. B is the front plate of the same, to which the lenses (not shown in the drawing) are attached. C is the plate-holder. This plate-holder is recessed at the top back part, against which a spring, n, fastened to the top of the camera, is made to bear. Another spring m, is made to bear against the bottom part of said plate-holder, which, together with the spring n, press said plate-holder against the camera, allowing at the same time the plate-holder to slide backward and forward at the end of said camera. On the top of the plate-holder C a projecting ledge, a, is fastened, by which this plate-holder is hung onto the camera. A hook-piece, w, fast to the top of the camera, passes over this projecting ledge a, and fits into the recessed part, to assist the holding on of the plate-holder. By this arrangement of hanging the plate-holder C upon the camera, the bottom of said plate-holder is kept clear of the trough D, which receives the drippings. The projecting ledge a is provided with notches 1 2 2, into which a spring catch, d, is made to catch, so as to hold the plate holder in its desired position when the same is moved so as to take several pictures one after the other. A small lever, g, acting against the under side of the catch d, forces said catch out of the notch when required. The vitrified corners E E' are made with circular ends or projections, S, and may have either two such projections, S, as shown on the corners E, or the same may be made with three circular projections, as shown at E', according to their size. By this construction of the vitrified or similar corners the fitting of the same into the wooden plate-holder frame is much simplified, and is much easier done, insuring at the same time greater accuracy and more solidity.

The front plate, B, against which the lenses are fastened, is at the top hinged to the camera-box. At its bottom end an angular piece, p, is fastened on, through which a screw-pin, o, passes, working in a suitable nut, x, fastened in the camera-box. By this arrangement the face of this front plate, B, and consequently of the lenses, may be varied, so as to bring the object in proper line, improving thereby the picture considerably. On the inside of this front plate, B, a plate, N, is attached with sufficient opening in the center, so as not to obstruct the view, and projecting some distance all around the outer edges of the plate B. A corresponding plate or frame, M, is attached to the inner sides of the camera-box, projecting some distance inward past the outer edges of the plate or frame N. By this arrangement the entrance of light into the camera-box A is prevented when the front plate, B, is moved either inward or outward.

Instead of hinging the front plate, B, at its upper end, as shown in Fig. I, the same may be centered near the middle, as shown in Fig. IV, so as to turn on a horizontal axis or point, k, arranged near the center of the front plate, B.

Instead of arranging the screw-pin o as represented in Fig. I, where said pin is operated at the front of the camera, this pin may be placed at the bottom of the camera-box, or pass through the bottom plate, as represented in Fig. IV, so as to be able to regulate the position and inclination of the front plate behind the machine, where the operator usually stands.

Instead of hinging the front plate, B, at its top to the camera, as represented in Fig. I, or of fastening the same so as to turn near its middle on a horizontal axis or point, as shown in Fig. IV, the same may be secured to the camera by four screw-pins, $o'$, passing through suitable angular pieces $h$ fast to the front plate, B, and working in suitable nuts $r$, fastened into the camera-box, as represented in Figs. V, VI, where Fig. V represents a cross-section and Fig. VI an end view. By this arrangement the surface of the front plate, B, and consequently of the lenses attached thereto, may be regulated in any desired direction. Instead of the plates N and M, (shown in Figs. I and IV,) an angular frame, $t$, may in that case be fastened on the inside of the camera-box, and an elastic or adjustable substance, G, be placed against this frame $t$ and the inside of the face-plate B, which will allow of any desired motion of said face-plate, and at the same time exclude the entrance of light to the inside of the camera when the plate B is moved inward or outward at either side.

What I claim as my invention, and desire to secure by Letters Patent, is—

1. The construction of the corners, whether vitrified or of other material, with circular projections S, in the manner and for the purpose substantially set forth.

2. The construction of the plate-holder C, with projecting ledge $a$, and also the plate-holder C and projecting ledge $a$, in combination with the hook $w$, spring-catch $d$, and lever $g$, said spring-catch $d$ working in suitable division notches or holes made in the ledge $a$, when combined and operating in the manner described.

3. The arrangement and use of the movable front plate, B, constructed as described.

4. In combination with a movable front plate, the arrangement of the plates or frames M and N, or their equivalent-acting in the manner and for the purpose described.

5. Hinging the front plate, B, to the camera, irrespective of the kind and mode of hinging, for the purpose substantially as set forth.

6. Moving the front plate, B, by means of a bolt, $o$, or its equivalent, whether passing from the front to the back or from the back to the front of the camera-box, as described.

7. The overhanging spring $n$, attached to the top of the camera-box, and acting against the back part of the plate-holder, in the manner and for the purpose specified.

8. Holding and moving the front plate by means of one or more screws, substantially as described and set forth.

JOHN STOCK.

Witnesses:
 HENRY E. RAEDER,
 JACOB STOCK.